United States Patent
Miyaguchi (10) Patent No.: US 8,023,359 B2
(45) Date of Patent: Sep. 20, 2011

(54) SYSTEM AND METHOD FOR CONVERTING SCAN DATA

(75) Inventor: Hiroshi Miyaguchi, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 735 days.

(21) Appl. No.: 12/164,680

(22) Filed: Jun. 30, 2008

(65) Prior Publication Data

US 2009/0324039 A1    Dec. 31, 2009

(51) Int. Cl.
*G03B 42/06* (2006.01)

(52) U.S. Cl. .......................................... 367/11

(58) Field of Classification Search ............... 367/11, 367/7, 107
See application file for complete search history.

(56) References Cited

U.S. PATENT DOCUMENTS

| | | | |
|---|---|---|---|
| 5,860,925 A | 1/1999 | Liu | |
| 6,360,027 B1 | 3/2002 | Hossack et al. | |
| 6,755,787 B2 | 6/2004 | Hossack et al. | |
| 2004/0181151 A1 | 9/2004 | Sumanaweera et al. | |
| 2009/0324039 A1* | 12/2009 | Miyaguchi | 382/131 |

FOREIGN PATENT DOCUMENTS

JP    04244956    * 9/1992

* cited by examiner

*Primary Examiner* — Daniel Pihulic (74) *Attorney, Agent, or Firm* — Steven A. Shaw; W. James Brady; Frederick J. Telecky, Jr.

(57) ABSTRACT

An ultrasound device generates polar-coordinate image data divided up into an (N×M) array of polar-coordinate image data blocks; a first external memory configured to store the (N×M) array of data blocks; a second external memory configured to store x-y coordinate image data corresponding to the polar-coordinate image data; a video processing chip comprising an internal memory configured to store an (N×R) array of the polar-coordinate image data blocks; and a controller configured to perform a data conversion operation on the (N×R) array of data blocks to generate x-y coordinate image data, and to store the x-y coordinate image data to the second external memory. N, M, and R are integers greater than 1; R is less than M; and an internal access time for the internal memory element is shorter than an external access time for the first external memory element.

25 Claims, 7 Drawing Sheets

SYSTEM AND METHOD FOR CONVERTING SCAN DATA

TECHNICAL FIELD

The present invention relates to ultrasound scanning and display devices. In particular, it relates to a system and method for converting polar coordinate data generated by an ultrasound system into x-y coordinate data suitable for display on a video display unit.

BACKGROUND

Ultrasound scanning devices obtain image data by emitting a number of ultrasonic beams at a target, and then detecting the reflections of those waves. Based on these reflections, the ultrasound device generates data that will show an image of the target. Because this data results from an ultrasound scan, it is sometimes referred to as scan data.

In practice, a typical ultrasound device will have an emitter device, often hand-held, that contains a number of ultrasonic beam emitters. These ultrasonic beam emitters will each transmit an ultrasonic beam from essentially the same starting point, with each beam fanning out at a slightly different angle. In this way, the beams will cover the entire target area.

As a result of this engineering design choice, the image data that is gathered from the reflected ultrasonic waves is most easily stored using polar coordinates. In particular, each data point corresponding to an ultrasonic reflection is identified by an angle corresponding to the angle of the reflected beam, a distance (i.e., radius) of the reflection, and pixel data.

However, standard video display devices, such as cathode ray tubes (CRTs), liquid crystal displays (LCDs), plasma displays, or the like, are typically laid out with a set of display pixels using x-y coordinates (i.e., Cartesian coordinates). In other words, the display devices usually have their display pixels set up in an array of parallel rows and parallel columns defined using x-y coordinates. Images are provided to the display device by providing image data in a similar array that corresponds to the pixel array of the display device. This can be accomplished using a raster scan (e.g., in a CRT), individual addressing of pixel display elements (e.g., in an LCD), or any other suitable method.

When using such a display element in an ultrasound system, it is therefore necessary for the system to convert the received ultrasound image data from polar coordinates into x-y coordinates so that it will be suitable for desired display device. This is typically achieved by performing a mathematical conversion process on the polar coordinate data to approximate x-y coordinate data that corresponds to the polar coordinate data.

Furthermore, because an ultrasound device must display its images in real-time, it is necessary for this conversion process to likewise be performed in real-time. This means that whatever processor is performing the conversion process must be able to access a stored image frame polar coordinate data quickly enough to achieve real-time conversion into x-y coordinate data. As a result, the polar coordinate data must typically be stored in a fast-access memory element, such as an internal memory element associated with the processor, e.g., an internal CPU cache, such as a level 1 cache or a level 2 cache. In one embodiment, this can be implemented using a static random access memory (SRAM) element.

However, the expense of a memory generally increases along with its speed and its size. This means that a memory both large enough to hold the entire polar coordinate data set for a given ultrasound image frame and with a fast enough access time or latency to allow real-time conversion to x-y coordinate data would be comparatively expensive It would therefore be desirable to provide a way to initially store the polar coordinate data in a cheaper, slower memory, and switch it to a faster memory only as needed for data conversion.

SUMMARY

Accordingly, An ultrasound system is provided, comprising: an ultrasound emitter and detector element configured to emit ultrasound waves and detect ultrasound reflections to generate polar-coordinate image data, the polar-coordinate image data being divided up into an (N×M) array of polar-coordinate image data blocks, each of the polar-coordinate image data blocks being defined by a block angular range selected from N possible angular ranges, and a block radius range selected from M possible radius ranges; a first external memory element configured to store the (N×M) array of the polar-coordinate image data blocks; a second external memory element configured to store x-y coordinate image data corresponding to the polar-coordinate image data; and a video processing chip, comprising an internal memory element configured to store an (N×R) array of the polar-coordinate image data blocks, the (N×R) array including R adjacent polar-coordinate image data blocks for each of the N possible angular range values, transferred from the first external memory element; and a controller configured to perform a data conversion operation on the (N×R) array of the polar-coordinate image data blocks to generate x-y coordinate image data, and to store the x-y coordinate image data to the second external memory. In this system, N, M, and R are all integers greater than 1, R is less than M, and an internal access time or latency for the internal memory element is shorter than an external access time or latency for the first external memory element.

The ultrasound system may further comprise video processing front end circuitry connected between the ultrasound emitter and detector element and the controller, the video processing front end circuitry configured to perform front end signal processing on the polar-coordinate image data before the polar-coordinate image data is stored in the external memory. The ultrasound system may further comprise a display element for generating an ultrasound image based on the x-y coordinate image data stored in the external memory. The ultrasound system may further comprise video processing back end circuitry connected between the external memory element and the display element, the video processing back end circuitry configured to perform back end signal processing on the x-y coordinate image data before the x-y coordinate image data is provided to the display element. The controller may be is a digital signal processor.

In the ultrasound system, each of the polar-coordinate image data blocks may include a plurality of polar-coordinate image data elements, each of the polar-coordinate image data elements being identified by an associated radius value, an associated angular value, and multiple-bit pixel value.

The internal access time or latency for the internal memory element is at least half that of the external access time or latency for the external memory element. The video chip may be configured to perform a direct memory access process to perform a memory swap of one or more of the polar-coordinate image data blocks from the external memory to the internal memory. In addition, the video processing chip may be configured to transfer each of the polar-coordinate image data blocks in the (N×M) array from the external memory and into the internal memory only once.

The controller may be configured to convert the sub-group of the polar-coordinate image data into a sub-group of x-y coordinate image data using an interpolation process. The interpolation process may be one of: bilinear interpolation, bi-cubic interpolation, and spline interpolation.

A method of scan-converting a set of polar-coordinate image data to a set of x-y coordinate image data is also provided, comprising: scanning an object with an ultrasound emitter and detector element to generate polar-coordinate image data associated with the object, the polar-coordinate image data including an (N×M) array of polar-coordinate image data blocks, each of the polar-coordinate image data blocks being defined by a block angular range selected from N possible angular ranges, and a block radius range selected from M possible radius ranges; storing the (N×M) array of the polar-coordinate image data blocks into an external memory element; transferring an (N×R) array of the polar-coordinate image data blocks selected from the (N×M) array of the polar-coordinate image data blocks from the external memory element into an internal memory element, the (N×R) array including R adjacent polar-coordinate image data blocks for each of the N possible angular range values; generating x-y coordinate image data based on the (N×R) array of the polar-coordinate image data blocks; storing the x-y coordinate image data to the external memory; and transferring one or more of the polar-coordinate image data blocks from the external memory to the internal memory, such that each of the one or more transferred polar-coordinate image data blocks replaces a previous polar-coordinate image data block, each respective transferred polar-coordinate image data block and previous polar-coordinate image data block having either a same associated angular range value or a same associated radius range value, and being adjacent to a same stored polar-coordinate image data block. The first memory access time or latency for the operation of generating the x-y coordinate image data is shorter than a second memory access time or latency for the operation of storing the (N×M) array of the polar-coordinate image data blocks into the external memory element.

The method repeats the operations of generating x-y coordinate image data, storing the x-y coordinate image data to the external memory, and transferring one or more of the polar-coordinate image data blocks from the external memory to the internal memory, as needed until all of the polar-coordinate image data blocks in the (N×M) array of the polar-coordinate image data blocks have been transferred into the internal memory element.

The operations of generating x-y coordinate image data, storing the x-y coordinate image data to the external memory, and transferring one or more of the polar-coordinate image data blocks from the external memory to the internal memory are repeated such that each of the polar-coordinate image data blocks is transferred from the (N×M) array into the internal memory only once.

The method of scan-converting may further comprise performing front end signal processing on the polar-coordinate image data before storing the (N×M) array of the polar-coordinate image data blocks into the external memory element. The method of scan-converting may further comprise providing the x-y coordinate image data from the external memory to a display element; and generating an ultrasound image on the display element based on the x-y coordinate image data. The method of scan-converting may further comprise performing back end signal processing on the x-y coordinate image data before the x-y coordinate image data is provided to the display element.

Each of the polar-coordinate image data blocks may include a plurality of polar-coordinate image data elements, each of the polar-coordinate image data elements being identified by an associated radius value, an associated angular value, and multiple-bit pixel value.

The first memory access time or latency may be at least half that of the second memory access time or latency. The operation of transferring one or more of the polar-coordinate image data blocks from the external memory to the internal memory may be performed using a direct memory access process. The operation of generating x-y coordinate image data based on the (N×R) array of the polar-coordinate image data blocks may be performed using an interpolation process. The interpolation process may be one of: bilinear interpolation, bi-cubic interpolation, and spline interpolation.

An ultrasound scan-converter is also provided, comprising: first means for storing data, having a first stored data access time; second means for storing data, having a second stored data access time or latency shorter than the first stored data access time or latency; third means for storing data; means for scanning an object with an ultrasound emitter and detector element to generate polar-coordinate image data associated with the object, the polar-coordinate image data including an (N×M) array of polar-coordinate image data blocks, each of the polar-coordinate image data blocks being defined by a block angular range selected from N possible angular ranges, and a block radius range selected from M possible radius ranges; means for storing the (N×M) array of the polar-coordinate image data blocks into the first means for storing data; means for transferring an (N×R) array of the polar-coordinate image data blocks selected from the (N×M) array of the polar-coordinate image data blocks from the first means for storing data into the second means for storing data, the (N×R) array including R adjacent polar-coordinate image data blocks for each of the N possible angular range values; means for generating x-y coordinate image data based on the (N×R) array of the polar-coordinate image data blocks; means for storing the x-y coordinate image data to the third means for storing data; and means for transferring one or more of the polar-coordinate image data blocks from the first means for storing data into the second means for storing data, such that each of the one or more transferred polar-coordinate image data blocks replaces a previous polar-coordinate image data block, each respective transferred polar-coordinate image data block and previous polar-coordinate image data block having either a same associated angular range value or a same associated radius range value, and being adjacent to a same stored polar-coordinate image data block.

The ultrasound scan-converter may further comprise means for performing front end signal processing on the polar-coordinate image data located between the means for scanning an object and the means for storing the (N×M) array of the polar-coordinate image data blocks into the external memory element. The ultrasound scan-converter may further comprise means for displaying an ultrasound image on the display element based on the x-y coordinate image data; and means for providing the x-y coordinate image data from the first means for storing data to the means for displaying an ultrasound image. The ultrasound scan-converter may further comprise means for performing back end signal processing on the x-y coordinate image data before the x-y coordinate image data is provided to the display element.

Each of the polar-coordinate image data blocks may includes a plurality of polar-coordinate image data elements, each of the polar-coordinate image data elements being identified by an associated radius value, an associated angular value, and multiple-bit pixel value.

The means for transferring one or more of the polar-coordinate image data blocks from the first means for storing data into the second means for storing data may be configured to perform a direct memory access process.

The means for generating x-y coordinate image data based on the (N×R) array of the polar-coordinate image data blocks may be configured to generate x-y coordinate image data using an interpolation process. The interpolation process may be one of: bilinear interpolation, bi-cubic interpolation, and spline interpolation.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

In overview, the present disclosure concerns the conversion of polar coordinate image data in an ultrasound device into x-y coordinate image data.

This objective of fast and economical conversion of scan data is accomplished by having a slow (and therefore cheaper) memory to hold the entirety of the polar coordinate image data, and then a smaller faster memory that cycles portions of the polar coordinate image data into it so that it can be quickly converted into x-y coordinate data. To facilitate this, the polar coordinate image data is broken up into blocks, each of which is moved into the faster memory before it is needed, and then swapped out with a new data block when it has been fully converted.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs, along with a variety of memory types. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation, and would be aware of the many types of available computer memory. Therefore, in the interest of brevity and minimization of any risk of obscuring principles and concepts, further discussion of such software, ICs, and memory elements, if any, will be limited to the essentials with respect to the principles and concepts used by the exemplary embodiments.

In addition, although the disclosure shows conversion from polar coordinate data received from a polar-scanned image into x-y coordinate data appropriate for display in a particular image size, the disclosed system and method can easily be extended to apply to other data conversion situations. For example, the disclosed system and method could easily be modified to apply to the conversion of rectangular scan data or parallelogram scanned data into x-y coordinate data appropriate for display in a particular image size by simply modifying the arrangement of the array of scanned data and the appropriate data interpolation process.

Ultrasound Scanning and Data Conversion

Figure 1:
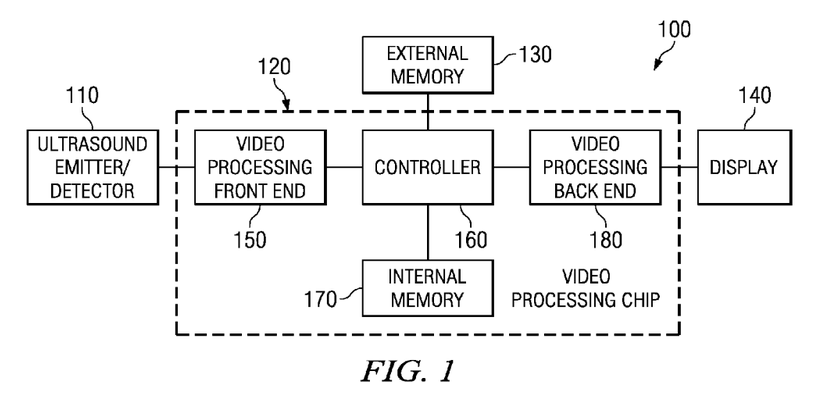
FIG. 1 is a block diagram showing an ultrasound device according to disclosed embodiments.

FIG. 1 is a block diagram showing an ultrasound device 100 according to disclosed embodiments. As shown in FIG. 1, the ultrasound device 100 includes an ultrasound emitter/detector 110, a video processing chip 120, an external memory element 130, and a display device 140. The video processing chip 120 further includes video processing front end circuitry 150, a controller 160, an internal memory element 170, and video processing back end circuitry 180.

The ultrasound emitter/detector 110 operates by sending out a number of ultrasonic beams at a target from a central point and then detecting the reflections of these beams to generate a number of pixels of image data that describe the scanned image.

The location of each pixel will be defined by an angular value and a radius value. And the pixel itself will be defined by a number of image data bits. The angular value and the radius value will define where in the ultrasound image the pixel appears with respect to an origin point. The origin point corresponds generally to the origin of the ultrasound beams; the angular value corresponds to the beam responsible for generating the pixel; and the radius value corresponds to the point along the beam to which the pixel corresponds. The pixel data bits define how the pixel should be displayed, e.g., as 16-bit grayscale data, 24-bit RGB data, or any other suitable bit representation.

The video processing chip 120 accepts the polar coordinate image data generated by the ultrasound emitter/detector 110, converts it to x-y coordinate image data, and provides the x-y coordinate image data to the display device 140. In various embodiments, the video processing chip 120 can either store the x-y coordinate image data in a set location (e.g., the external memory element 130) until the data conversion is complete and then send it to the display device 140, or it can send the converted data to the display 140 as it is converted and allow the display to store the x-y coordinate image data.

The external memory element 130 is a dynamic memory external to the video processing chip, and of sufficient size to contain an entire set of polar coordinate image data (i.e., one entire scanned frame for display). In the disclosed embodiment, the external memory element 130 is a dynamic random access memory (DRAM), though in alternate embodiments any suitable memory device can be used.

In some embodiments the external memory element 130 may actually be multiple physical or virtual memory elements. For example, in one embodiment a first external memory element could store the input polar coordinate image data and a second external memory element could store the x-y coordinate image data for output. In fact, these memories need not be of the same type. However, for the sake of simplicity in the disclosure, all such memories that are not contained on the video processing chip 120 will be collectively referred to as the external memory element 130.

The display device 140 is configured to display an ultrasound image based on x-y coordinate image data received from the video processing chip 120. It can be any suitable display element, e.g., a CRT display, an LCD display, a plasma display, or the like.

In some embodiments the display device 140 is configured to receive data relating to an entire image frame from the video processing chip 120 and simply display that frame. In other embodiments, the display element may contain a memory element to contain image data, and may receive the image data piecemeal as it is converted. Then, when an entire image frame of data is obtained, the display element will display it.

The video processing front end circuitry 150 is a circuit for performing various front end operations on the incoming polar coordinate data received from the ultrasound emitter/detector 110. This can include filtering, amplification, beamforming, demodulation, resolution improvement, velocity detection, or the like, as would be understood by one of ordinary skill in the art.

The controller 160 operates to control the conversion of the polar coordinate image data received from the ultrasound emitter/detector 110 into x-y coordinate data that can be sent to the display device 140. It coordinates the transfer of data from the ultrasound emitter/detector 110 to the external memory element 130, the transfer of data between the external memory element 130 and the internal memory 170, and between the controller 160 and the display device 140.

In various embodiments the controller can be a digital signal processor (DSP), a central processing unit (CPU), a field-programmable gate array (FPGA), an application-specific integrated circuit (ASIC), or any kind of appropriate microprocessor.

The internal memory element 170 is a memory element contained on same chip as the controller 160, and which has a faster memory access speed for the controller than the external memory element 130. The access speed or latency of the internal memory element 170 must be sufficient that the controller 160 can convert one frame of polar coordinate image data into one frame of x-y coordinate image data and send the frame of x-y coordinate image data to the display device 140 within the time allowed for the display of one ultrasound image frame. In the disclosed embodiment, the internal memory element 170 has a memory access time or latency that is at least twice as fast as that of the external memory. But this can vary in alternate embodiments. In one embodiment, the internal memory element 170 can be an internal memory cache such as a level 1 or level 2 cache.

The video processing back end circuitry 180 is a circuit for performing various back end operations on the incoming x-y coordinate data received from the controller 160. This can include filtering, amplification, resolution improvement, color mapping, brightness control, contrast control, sharpness control, hue control, or the like, as would be understood by one of ordinary skill in the art.

It should be noted that numerous modifications can easily be made to the ultrasound circuit 100. For example, although all data links are shown as passing through the controller 160, it is also possible to have various elements directly connected to each other, or to have them connected to a data bus that is controlled by the controller 160.

Figure 2:
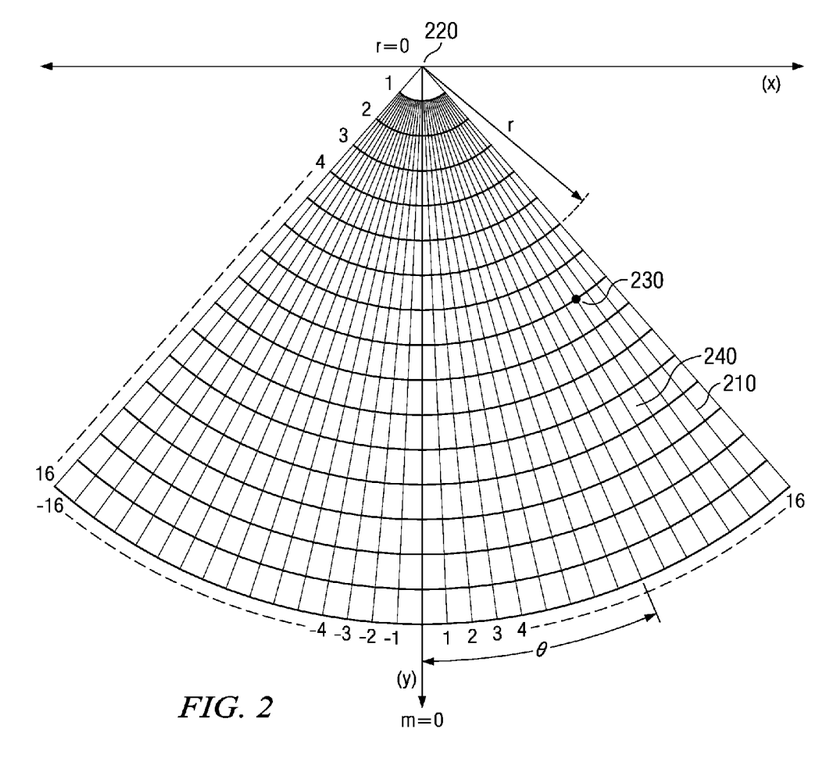
FIG. 2 is graph showing ultrasound scanning using polar coordinates according to disclosed embodiments.

FIG. 2 is graph showing ultrasound scanning using polar coordinates according to disclosed embodiments. As noted above and described in FIG. 2, the ultrasound scanning is performed by sending a number of ultrasonic scanning beams 210 out from a central point 220, each at a set angle θ from a reference beam, detecting reflections of these ultrasonic scanning beams 210, and generating an array of pixels 230 located using polar coordinates. In other words, each pixel in the array is identified by an angle θ, a radius r, and a pixel bit value.

An exemplary ultrasound device uses 256 beams spread out across approximately ninety degrees, with each beam having 512 pixels 230 spaced throughout a set radius range, and with each pixel being defined by 16 bits. This equates to 256 Kbytes for each frame ultrasound image frame. Alternate embodiments may, of course, vary these numbers as desired, changing the number of beams 210, the number of samples per beam, the angular spread of the beams, and the number of bits that define each pixel 230. However, for simplicity of disclosure, this exemplary embodiment will be described.

Each polar coordinate image frame (i.e. the array of pixel data corresponding to one ultrasound scanning period) will be functionally divided up into an array of data blocks 240. Each block 240 will be bounded between two angular values and two radius values, and will contain all of the pixels 230 within the block 240, such that all of the pixels 230 each fall into only a single data block 240. Keeping each pixel 230 to a single data block 240 can be accomplished by having an edge rule to determine which block 240 a pixel 230 on a block edge falls into, or by making the block edges at angles and radius that are in between normal pixel values. The disclosed embodiment contains 33 angular delimiters (indexed from $\theta_{-16}$ to $\theta_{16}$), and 17 radius delimiters (indexed from $r_0$ to $r_{16}$). This provides a polar array having 32 columns and 16 rows, which results in 512 total blocks. However, it should be understood that this is by way of example only. Alternate embodiments can choose different ways of splitting up the pixels into blocks, and may have different numbers of rows, columns, and total blocks 240, subject only to the restrictions noted below.

In some embodiments the polar coordinate image data will start at the zero radius value ($r_0$) for each ultrasonic scan beam (i.e., at the polar coordinate origin). In other embodiments, the polar coordinate image data will start at a radius greater than zero. In the disclosed embodiment, the polar coordinate image data starts at a radius corresponding to the first radius delimiter $r_1$. However, this is by way of example only. The scanning and conversion processes will work in the same manner regardless of whether the image includes the entire radius range or only a limited radius range.

Figure 3:
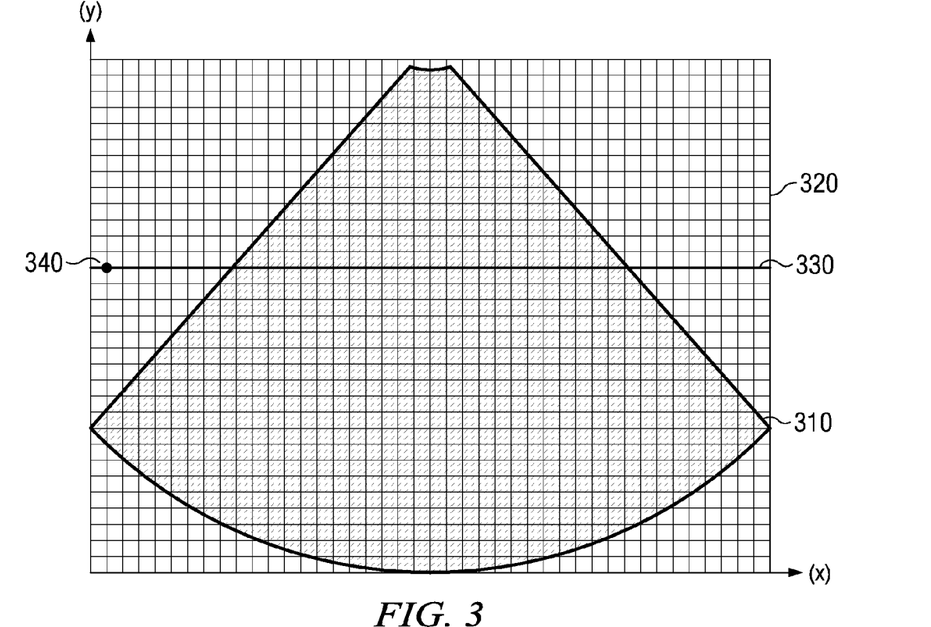
FIG. 3 is a diagram showing a vertically displayed ultrasound image using x-y coordinates according to disclosed embodiments.

FIG. 3 is a diagram describing a vertically displayed ultrasound image 310 on a display screen 320 of the display device 140 using x-y coordinates according to disclosed embodiments. As shown in FIG. 3, the ultrasound image 310, such as an ultrasound image initially defined by pixels in polar coordinate image data, must be displayed using x-y coordinates. This is because the display device 140 will generally display data using an x-y coordinate array of pixels 340. In a CRT display device, or the like, the pixels will be displayed in a raster scan that displays the pixels 340 one raster line (scan line) 330 at a time. In an LCD display device, or the like, the pixels 340 will be displayed according to a display scheme that addresses each pixel in the array in turn. Regardless, conventional display devices are set up to display x-y coordinate arrays of pixels with parallel rows and parallel columns of pixels. And so, the ultrasound image must be in x-y coordinates when it is sent to the display device 140.

Figure 4:
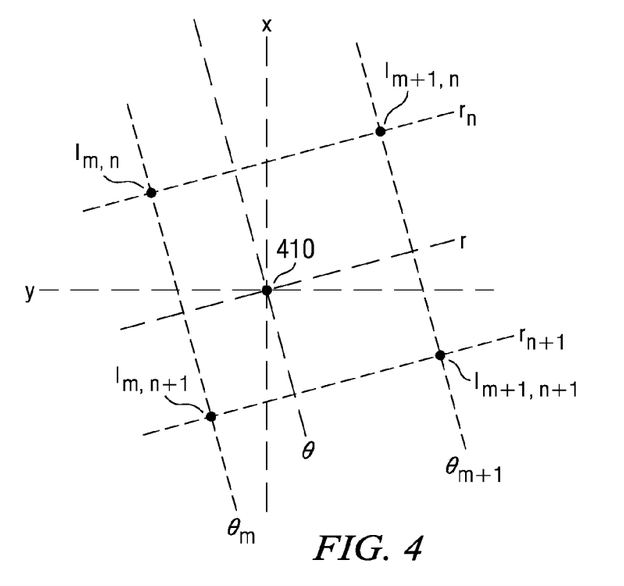
FIG. 4 is a graph describing an interpolation process according to disclosed embodiments.

FIG. 4 is a graph showing how an interpolation process is performed according to disclosed embodiments. As shown in FIG. 4, each x-y coordinate pixel 410 will fall in between four surrounding polar coordinate pixels $I_{m,n}$, $I_{m+1,n}$, $I_{m,n+1}$, and $I_{m+1,n+1}$. For pixels that fall on the edges of the polar coordinate image data, or those that fall outside of the polar coordinate image data, certain null values can be provided for any polar coordinate pixel values for pixel locations that do not correspond to a location within the polar coordinate image data.

In order to generate a corresponding x-y coordinate pixel 410, a processor 160 will read in location data and pixel values of the four surrounding polar coordinate pixels $I_{m,n}$, $I_{m+1,n}$, $I_{m,n+1}$, and $I_{m+1,n+1}$ and perform an interpolation process based on the values of these pixels, and their locations. An exemplary bilinear conversion function is shown below.

Each of the surrounding polar coordinate pixels $I_{m,n}$, $I_{m+1,n}$, $I_{m,n+1}$, and $I_{m+1,n+1}$, will have an angle $\theta_i$ and a radius $r_i$ associated with it. Likewise, although the location of the x-y coordinate pixel 410 is defined by an x-value and a y-value, it can also be defined by polar coordinates using a relatively simple conversion process:

$$r = \sqrt{x^2 + y^2}, \text{ and} \quad (1)$$

$$\theta = \arctan\left(\frac{x}{y}\right), \quad (2)$$

where x is the x-coordinate location of the x-y coordinate pixel 410, and y is the y-coordinate location of the x-y coordinate pixel 410, if the x-y coordinates and polar coordinates start from the same origin point.

The pixel value $P_{x,y}$ of the x-y coordinate pixel 410 can then be determined as follows:

$$P_{x,y} = \left(\frac{1}{\Delta\theta \cdot \Delta r}\right) \cdot \begin{bmatrix} (\theta - \theta_m)(r - r_n)P_{m+1,n+1} + (\theta - \theta_m)(r_{n+1} - r)P_{m+1,n} + \\ (\theta_{m+1} - \theta)(r - r_n)P_{m,n+1} + (\theta_{m+1} - \theta)(r_{n+1} - r)P_{m,n} \end{bmatrix} \quad (3)$$

where r and θ are determined from equations (1) and (2) above; $P_{m,n}$, $P_{m+1,n}$, $P_{m,n+1}$, and $P_{m+1,n+1}$ are the pixel values for each corresponding surrounding pixel $I_{m,n}$, $I_{m+1,n}$, $I_{m,n+1}$, and $I_{m+1,n+1}$; $\theta_m$ is the angular value for the pixels $I_{m,n}$ and $I_{m,n+1}$; $\theta_{m+1}$, is the angular value for the pixels $I_{m+1,n}$, and $I_{m+1,n+1}$, $r_n$ is the radius value for the pixels $I_{m,n}$ and $I_{m+1,n}$; $r_{n+1}$ is the radius value for the pixels $I_{m,n+1}$ and $I_{m+1,n+1}$;

$$\Delta\theta = \theta_{m+1} - \theta_m \quad (4)$$

and $$\Delta r = r_{n+1} - r_n \quad (5)$$

However, this interpolation process is simply being provided as one exemplary embodiment as to how interpolation can be implemented. Other interpolation processes may be used, such as bi-cubic interpolation, spline interpolation, or any other suitable interpolation process.

In addition, although the embodiment of FIG. 4 discloses an interpolation process that uses four surrounding polar coordinate pixels, this is by way of example only. Alternate interpolation processes can be performed using more surrounding polar coordinate pixels. For example, some interpolation processes can use eight surrounding polar coordinate pixels, or more.

Regardless of the interpolation process used, however, the controller 160 performing the interpolation process for a given ultrasound image frame will at some point require every point of data of the polar coordinate image data array in order to generate a corresponding x-y coordinate image data array.

Scan Data Conversion of a Vertically Displayed Ultrasound Image

Figure 5:
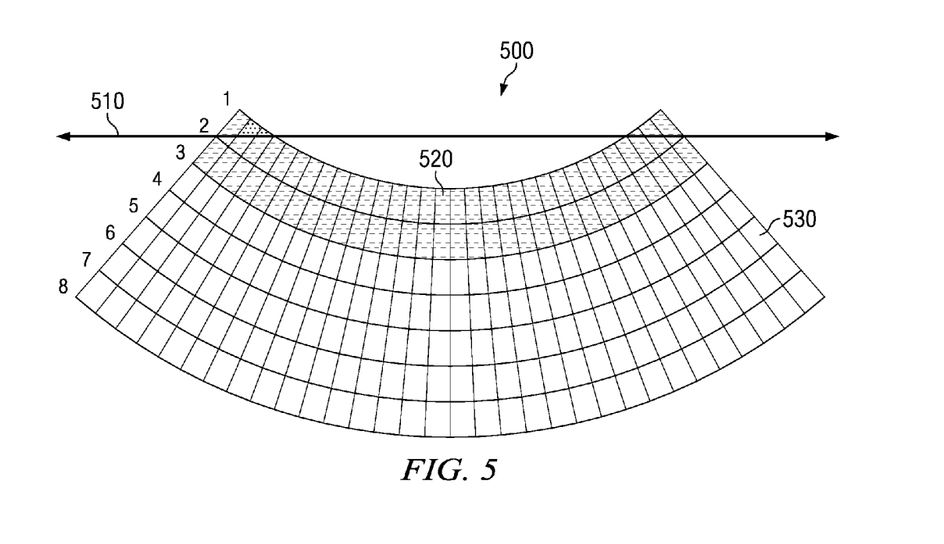
FIGS. 5, 6, and 7 are diagrams showing a scan process for a vertically displayed ultrasound image according to disclosed embodiments.
Figure 6:
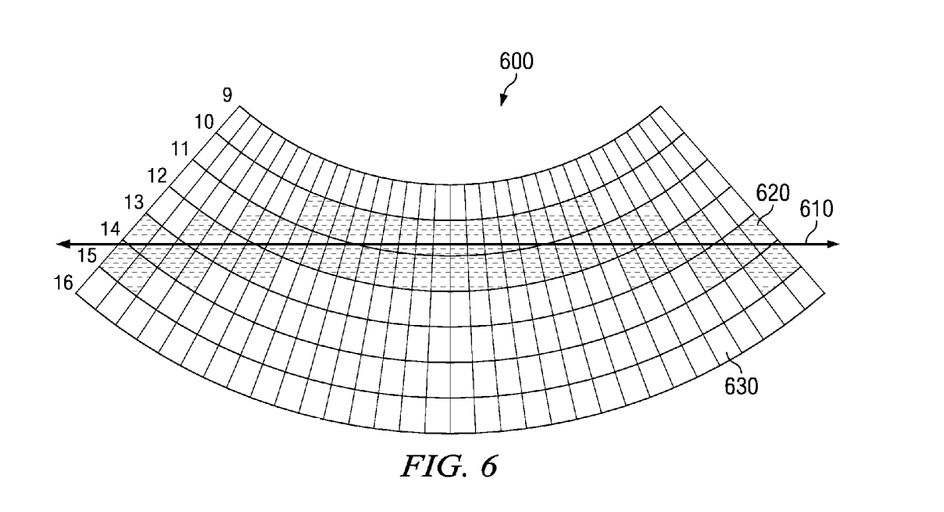
Figure 7:
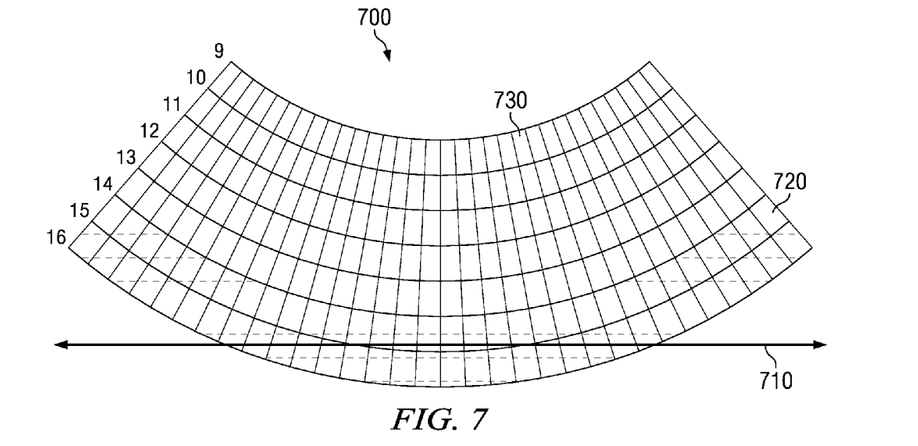

FIGS. 5, 6, and 7 are diagrams showing a scan process for a vertically displayed ultrasound image according to disclosed embodiments. In this exemplary scan process, the ultrasound image will be displayed vertically (i.e., with the scanning beam origin point at the top of the image).

For simplicity of disclosure, each of FIGS. 5, 6, and 7 shows only a portion of the polar coordinate image data. In particular, FIGS. 5, 6, and 7 each include only seven of fifteen rows of data blocks. However, it should be clear with reference to FIG. 2, that the entirety of the image data includes all fifteen blocks from this exemplary embodiment. In addition, it should be noted that FIGS. 5, 6, and 7 are not all to the same scale, since the lower-indexed blocks will be packed more tightly than the higher-indexed blocks, since they are closer to the scan beam origin point.

As noted with respect to FIG. 2, immediately prior to the scan conversion process, all of the polar coordinate image data associated with a given ultrasonic image frame will be stored in the external memory element 130 as an array of polar coordinate data blocks 240.

As shown in FIG. 5, at the beginning of the scan conversion process, two rows of the polar coordinate data blocks 240 are initially stored in the internal memory element 170 as internally stored data blocks 520. All other data blocks will remain as externally stored data blocks 530, whose data is contained only in the external memory element 130.

The processor then begins converting data, one x-y coordinate scan line 510 at a time, starting at the top of the image, with each scan line having a number of x-y coordinate pixels in it. Scan lines 510 begin the conversion process by performing interpolation operations on data contained in the internally stored data blocks 520. At the beginning of the conversion process, the interpolation process for the first x-y coordinate scan lines 510 will be performed using data stored in the internally stored data blocks 520.

As the conversion scan lines 510 progress from the top of the image to the bottom, they will eventually pass through a first data block 520 in a given column (i.e., for a given angular range), indicating that the image conversion process no longer requires any data from that data block 520. At this point, the conversion process will only need to use data in that column from the second internally stored data block 520.

Since the data in the first data block is no longer needed, the controller 160 can copy a third data block in the given column from the external memory element 130 to the internal memory element 170. This third data block is the next data block in the column that is adjacent to the second data block. And since the conversion process is at this point working on data solely from the second data block, no conversion time is lost by making this block data transfer, despite the fact that the access time of the external memory element 130 is relatively slow as compared to the access time of the internal memory element 170.

Then, as the conversion process finishes using data from the second data block, the controller 160 can swap in a fourth data block in the column into the internal memory element 170 in place of the second data block, and so on down the column. In this way, the controller 160 will always have the data it needs to perform the conversion process stored in the internal memory element 170.

As shown in FIG. 6, this process continues such that at any given time during the conversion process, the current x-y coordinate scan line 610 being generated will always have the data it needs for conversion, since the data blocks 620 surrounding that scan line 610 will always be in the internal memory element 170. This is because at the edges of the ultrasound image, the data blocks will transfer more quickly than those in the center, keeping the internally stored blocks 620 in a roughly linear shape surrounding the scan line 610. In fact, although for any given column there will always be two adjacent data blocks 620 stored in the internal memory element 170, the rows that contain these adjacent data blocks 620 need not be the same rows for each column. However, to ensure that there is sufficient overlap, at least one internally stored data block 620 in any given column must be in the same row as at least one internally stored data block 620 in an adjacent column.

Finally, as shown in FIG. 7, once a given column has the last two data blocks 720 stored in the internal memory element 170, the swapping process can end for that column. The controller 160 will then continue to generate the remaining x-y coordinate scanning lines 710 based on the last two rows of data blocks 720.

By performing this ping-pong style swapping operation, the ultrasound device 100 can ensure that it will always have the data it needs for image conversion in the more quickly accessible internal memory element 170. Moreover, it can meet this requirement with an internal memory element 170 that contains a smaller number of rows worth of data blocks (two in the disclosed embodiment), rather than the entire array. This allows for a significant cost savings, since the internal memory element 170 will generally be more expensive to manufacture than the external memory element 130.

Furthermore, since the data transfer from the external memory element 130 to the internal memory element 170 is performed in a block-by-block manner, using identically sized blocks, it is possible to implement the data transfer using a direct memory access (DMA) process. This can speed up the data transfer process as compared to a non-DMA memory transfer, since DMA transfers are generally quicker than a controller-coordinated data transfer. In addition, DMA transfers can be performed without the need for the controller 160 to coordinate the transfer. This can free up the controller 160 to either perform the calculations required for the interpolation process, or to perform other tasks required of the controller 160, which will serve to speed up the data conversion process in general.

The disclosed conversion process also keeps the number of block transfers fixed, since each data block need only be transferred into the internal memory element 170 once. And since each block is only transferred once, this fixed number of transfers is kept to the minimum possible.

In addition, since the number of block transfers is both minimized and fixed, it is possible to spread out the block transfers such that the number of block transfers required for any given scan line is minimized. Consider that in the disclosed embodiment there are 512 data blocks, meaning that there are 512 data block transfers required for a single ultrasound image frame.

For that same ultrasound image frame, there will be a known number of scan lines required. For example, a standard television display contains 480 raster lines. This means that the average number of block transfers per scan line can be easily calculated by dividing the number of block transfers by the number of scan line. In the disclosed embodiment this is equal to:

$$\frac{512 \text{ block transfers}}{480 \text{ scan lines}} = 1.07 \text{ block transfers/scan line}, \tag{6}$$

i.e., between one and two block transfers for each scan line.

This means that it may be possible to limit the controller 160 to make only two block transfers for every scan line. And by limiting the allowable number of block transfers, the controller 160 can put a limit on the time (and other resources) allocated for block transfer during a given scan line conversion. This can conserve system resources, making certain that data transfer operations will not take longer than the time required for the controller 160 to perform the interpolation operation, and freeing up the controller 160 or DMA circuitry to perform other functions during the conversion of the scan line.

However, since multiple blocks may become eligible for block transfer during a given scan line, it then becomes necessary to prioritize which blocks must be transferred first. This is done by identifying which blocks will be needed soonest for interpolation, and making these blocks the first blocks to be transferred. In the embodiment disclosed in FIGS. 5, 6, and 7, the blocks in the columns closest to the edges of the ultrasound image are likely to be needed first. As a result, the closer a block is to the edge of the image, the higher its priority for being transferred.

For example, consider if two block transfers are authorized for each scan line, as noted above. If data blocks in six columns become eligible for transfer during the conversion of a given scan line, then the controller will authorize the transfer of data blocks for the two columns closest to the edges of the ultrasound image (on either side). The other four columns will carry over to the conversion of the next scan line, where there may well be other columns authorized for block transfer. But each time a new determination is made, it should be made based on all of the columns currently authorized for data transfer.

And although there may be times where a large number of columns are authorized for transfer during a given scan line, the average number of transfers per scan line remains constant, so as long as the block transfers are front-loaded (i.e., are authorized early), eventually things will slow down enough for the transfers to catch up. If, however, the block transfers are back-loaded (i.e., authorized late), then it may be necessary to allow a greater number of block transfers per scan line to ensure that all of the blocks will be transferred.

Although FIGS. 5, 6, and 7 show scan conversion being performed from the top of x-y coordinate image to the bottom, it could just as easily be performed from the bottom to the top with the bottom scan lines being converted first. In this case, the initially loaded data blocks would be the bottom two rows, and the last loaded data blocks would be the top two rows. Intermediate transfers would be performed as noted above, except that the x-y coordinate scan lines would progress from the bottom of the image to the top of the image.

Likewise, the scanning could be performed from left-to-right or right-to-left, using scanning columns instead of scanning rows. The scanning process in this case would be similar to that shown below for FIGS. 9, 10, and 11, except rotated 90 degrees.

In addition, although FIGS. 5, 6, and 7 disclose that blocks from two rows of the array of polar coordinate data blocks 240 are stored in the internal memory element 170 at any given time, this can be expanded in alternate embodiments such that a greater number of rows are stored in the internal memory element. One possible reason for an increase in the size of the internal memory element 170 is that it is necessary that for some period of time during the conversion process, the scanning function will only require data from (k−1) blocks in a given column of internally stored polar coordinate data blocks 520, 620, 720, where k is the total number of rows of data blocks stored in the internal memory element 170 for each column of the array of polar coordinate image data. In other words, it is necessary that for some period of time, the controller 160 must not need to access data from one block in each column. Furthermore, it is necessary that this period of time is sufficient for the transfer of one of the blocks of data from the external memory element 130 to the internal memory element 170.

For example, if k=2 (i.e., two rows of data blocks are stored the internal memory element 170 for each column of the array of polar coordinate image data), then for some period of time, the conversion process must use data from only one block in any given column (since 2−1=1). And the conversion process must do so for a period of time sufficient to allow a new block of polar coordinate data to replace the block that has been completed.

Figure 8:
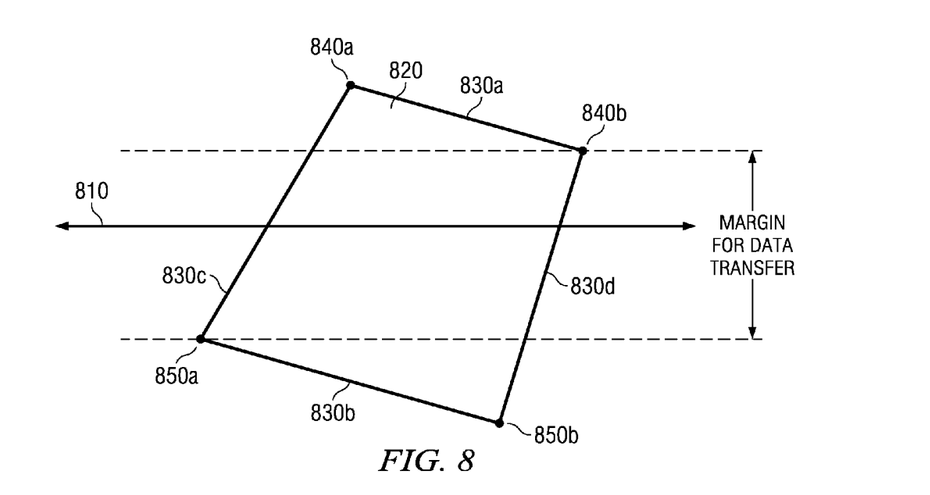
FIG. 8 is a diagram that describes a condition that will allow a scan conversion process to use only two rows of data blocks.

FIG. 8 is a diagram that describes a condition that will allow a scan conversion process to use only two rows of data blocks. As shown in FIG. 8, each block 820 can be considered to have a top boundary 830a, a bottom boundary 830b, and two side boundaries 830c, 830d. The top boundary 830a is the block boundary closest to the top of the display frame; the bottom boundary 830b is the block boundary closest to the bottom of the display frame; and the side boundaries 830c, 830d, are the block boundaries closest to the respective sides of the display frame. In particular, the top boundary 830a is defined by the line between the two top corners 840a, 840b of the block (i.e., the two corners closest to the top of the display frame); and the bottom boundary 830b is defined by the line between the two bottom corners 850a, 850b of the block 820 (i.e., the two corners closest to the top of the display frame).

The condition that will allow the use of only two blocks 820 per column requires that for each block 820, the position of the lower of the two top corners 840a, 840b of the block 820 be sufficiently higher than the position of the higher of the two bottom corners 850a, 850b of the block 820 such that one or more scan lines 810 will pass through both side boundaries 830c, 830d of the block 820. The number of scan lines 810 that pass between both side boundaries 830c, 830d of the block must be large enough that processing them will allow sufficient time for the next block in the column to be transferred from the external memory element 130 to the internal memory element 170.

If this condition is met, all scan lines 810 that pass through both side boundaries 830c, 830d of the block 820 will require data only from a single block 820 within the column. Thus, while the controller 160 is converting data for these x-y coordinate scan lines 810, the portion of the internal memory element 170 containing the other data block for that column is not needed, allowing the next data block for that column to be copied into the internal memory element 170 in its place.

The only exception to this is the last block that needs be transferred in any given column. Since there is no need to swap a new block into the internal memory element 170 after the last block in the column is stored, the last block need not allow any margin for data transfer.

In the case where this condition is not met, the same criteria can be applied to multiple adjacent data blocks in a column, such that the number of required data blocks per column is equal to one more than the number of blocks required to meet this criterion. For example, if this criterion can be met with the lower top corner of a given block and the upper bottom corner of a next adjacent block, then the process can be performed with three rows of stored data blocks. In this case, the scan lines 810 will only pass through these two adjacent blocks for a number of scan lines, allowing time for the third block in the column to be swapped out. This can be extended for any number of blocks until the condition is met.

Also, the requirements set forth with respect to FIG. 8 apply to horizontal scanning in which horizontal scan lines 810 are used. It would be apparent to one skilled in the art that this could easily be modified to apply to vertical scanning in which vertical scanning lines are used. In such a case, it would be necessary to have one or more vertical scan lines pass through the top and bottom boundaries of a block, rather than the side boundaries.

Scan Data Conversion of a Horizontally Displayed Ultrasound Image

Figure 9:
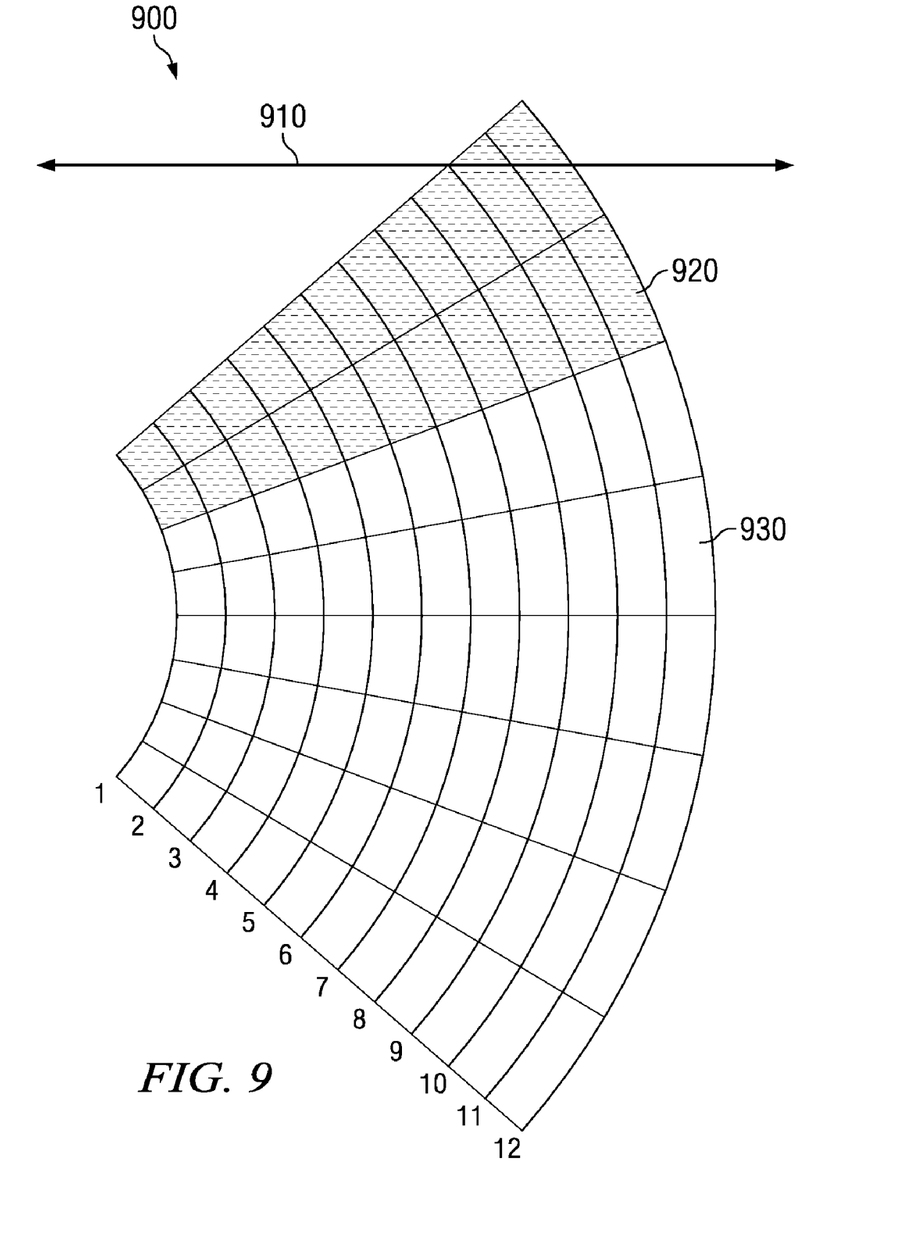
FIGS. 9, 10, and 11 are diagrams showing a scan process for a horizontally displayed ultrasound image according to disclosed embodiments.
Figure 10:
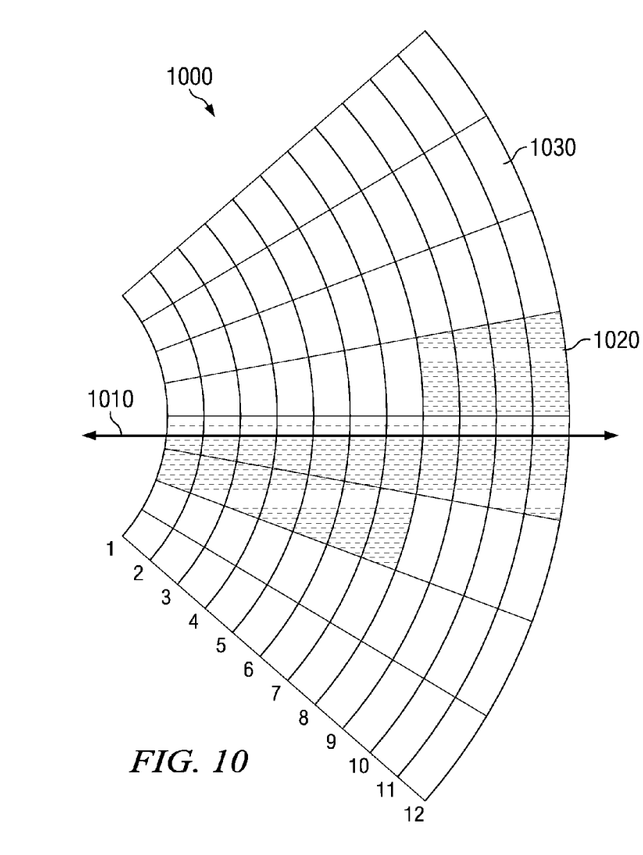
Figure 11:
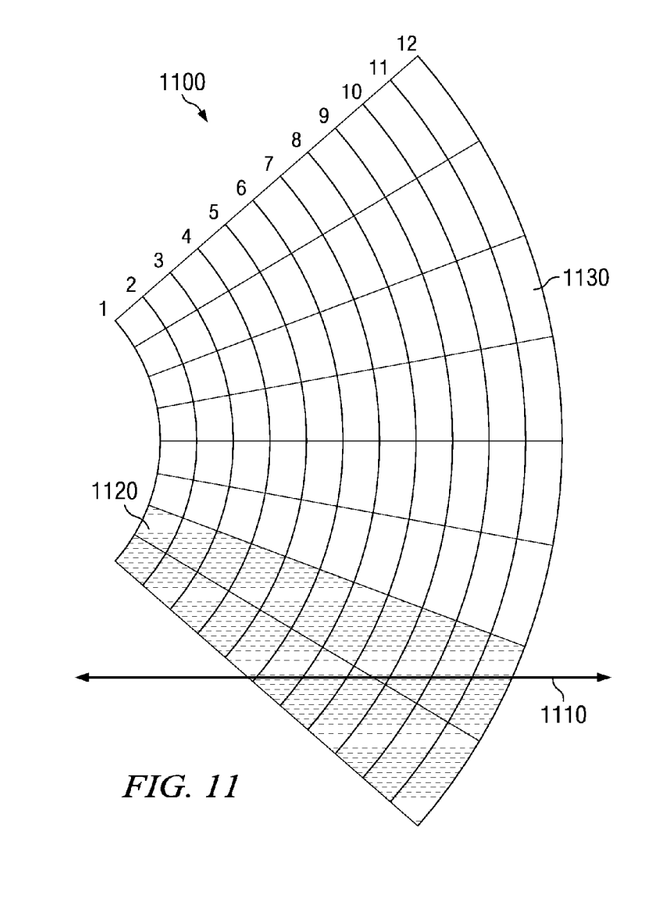

FIGS. 9, 10, and 11 are diagrams showing a scan process for a horizontally displayed ultrasound image according to disclosed embodiments. This process is comparable to the process disclosed above for a vertically displayed ultrasound image, except the origin point of the polar coordinates is to the left of the display rather than on the top. As a result, the shape (i.e., orientation) of the rows and columns will be reversed as compared to the embodiment disclosed with respect to FIGS. 5, 6, and 7 (i.e., columns are defined by radius values and rows are defined by angular values).

However, the scanning process, and the requirements and limitations are essentially the same. As shown in FIG. 9, at the beginning of the scan conversion process, two rows of the polar coordinate data blocks 240 are initially stored in the internal memory element 170 as internally stored data blocks 920. All other data blocks will remain as externally stored data blocks 930, whose data is contained only in the external memory element 130.

The processor then begins converting data, one x-y coordinate scan line 910 at a time, starting at the top of the image. Scan lines begin the conversion process by performing interpolation operations on data contained in the internally stored data blocks 920 to generate pixel data for the x-y coordinate pixels on the x-y coordinate scan line 910. Since it is just starting, the first x-y coordinate scan lines 910 will perform its interpolation process using data stored in the internally stored data blocks 920.

As the conversion scan lines 910 progress from the top of the image to the bottom, they will eventually pass through a first data block 920 in a given column, indicating that the image conversion process no longer requires any data from that data block 920. At this point, the conversion process will only need to use data in the given column from the second data block 920. At this point, the controller 160 can swap data from a third block in that column to replace the data from the first block, as noted above.

As shown in FIG. 10, this process continues such that at any given time, the current x-y coordinate scan line 1010 being generated will always have the data it needs for conversion, since the data blocks 1020 surrounding that scan line 1010 will always be in the internal memory element 170. This is because the data blocks will transfer to maintain a roughly linear pattern surrounding the scan line 1010. In fact, although for any given column there will always be two adjacent data blocks 1020 stored in the internal memory element 170, the rows that contain these adjacent data blocks 1020 need not be the same rows for each angular range. However, to ensure that there is sufficient overlap, at least one internally stored data block 1020 in any given column must be in the same row as at least one internally stored data block 1020 in an adjacent column.

Finally, as shown in FIG. 11, once a given column has the last two data blocks 1120 stored in the internal memory element 170, the swapping process can end for that column. The controller 160 will then continue to generate the remaining x-y coordinate scanning lines 1110 based on the last two rows of internally stored data blocks 1120, without reference to the externally stored data blocks 1130.

In addition, although FIGS. 9, 10, and 11 show scan conversion being performed from the top of x-y coordinate image to the bottom, it could just as easily be performed from the bottom to the top with the bottom scan lines being converted first. In this case, the initially loaded data blocks would be the bottom two rows, and the last loaded data blocks would be the top two rows. Intermediate transfers would be performed as noted above, except that the x-y coordinate scan lines would progress from the bottom of the image to the top of the image.

Likewise, the scanning could be performed from left-to-right or right-to-left, using scanning columns instead of scanning rows. The scanning process in this case would be similar to that shown above for FIGS. 5, 6, and 7, except rotated 90 degrees.

Method of Scan Data Conversion

Figure 12:
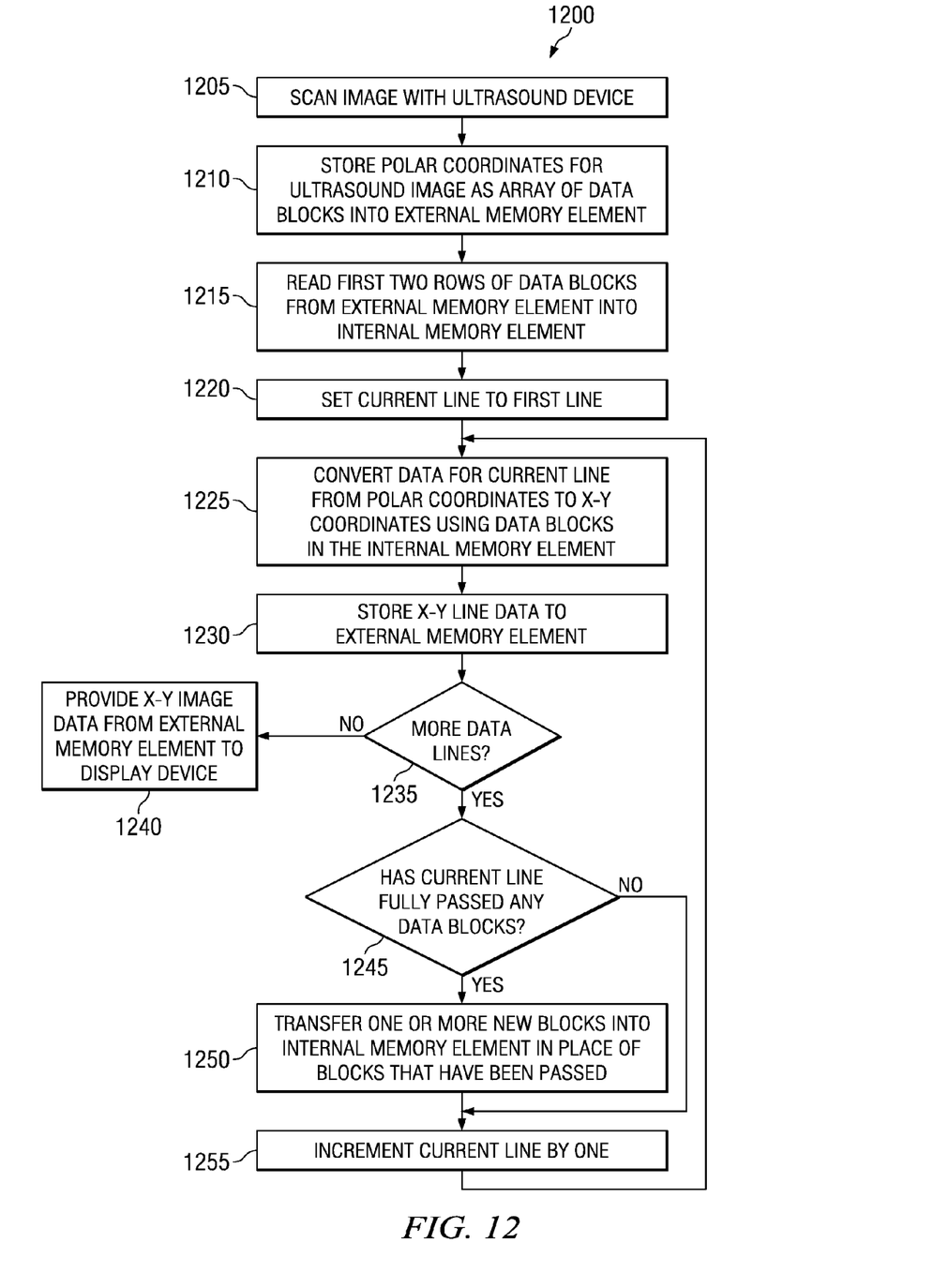
FIG. 12 is a flow chart describing a scan data conversion process according to disclosed embodiments.

FIG. 12 is a flow chart describing a scan data conversion process 1200 according to disclosed embodiments.

As shown in FIG. 12, the process begins by scanning an image with an ultrasound device (1205). This scanning operation results in the generation of an array of image pixels identified according to polar coordinates.

The polar coordinates and associated image pixels are then stored in an external memory element as an array of data blocks (1210). In the disclosed embodiment, these data blocks are of identical size. However, in alternate embodiments it is possible to vary the block size.

The first two rows of data blocks are then read from the external memory element into the internal memory element (1215), and the current scan line is set to the first scan line (1220). Although this shows the use of horizontal scan lines, alternate embodiments can use vertical scan lines. In such a case, the first two columns of data blocks would be stored initially.

The process then proceeds to convert data for the current scan line from polar coordinates to x-y coordinates using data from the data blocks stored in the internal memory element (1225). This can be accomplished using an interpolation process, such as bilinear interpolation, bi-cubic interpolation, spline interpolation, or the like, as described above with reference to FIG. 4.

The converted x-y coordinate image data is then stored in an external memory element (1230). This can be the same external memory element as the block data is stored in, or a different external memory element.

The process then determines whether there are any data lines remaining (1235). If not, then the x-y coordinate image data is provided from the external memory in which it is stored to a display device (1240).

If, however, there are more data lines to scan, the process determines whether the current data line has fully passed any of the data blocks (1245). If it has, the process transfers one or more new blocks into the internal memory in place of the blocks that have been passed (1250). This is done in a manner that maintains a desired number of blocks in any given column (two in the disclosed embodiment). It may also be performed using a prioritization process as noted above.

Once the block transfer is completed, or if no block transfer is required since no blocks have been passed, the process increments the current line by one (1255) and again performs data conversion for the current line (1225).

The process then continues until all of the data lines have been converted and the final x-y image is sent to the display device.

CONCLUSION

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed:

1. An ultrasound system, comprising:
an ultrasound emitter and detector element configured to emit ultrasound waves and detect ultrasound reflections to generate polar-coordinate image data, the polar-coordinate image data being divided up into an (N×M) array of polar-coordinate image data blocks, each of the polar-coordinate image data blocks being defined by a block angular range selected from N possible angular ranges, and a block radius range selected from M possible radius ranges;
a first external memory element configured to store the (N×M) array of the polar-coordinate image data blocks;
a second external memory element configured to store x-y coordinate image data corresponding to the polar-coordinate image data; and
a video processing chip, comprising
an internal memory element configured to store an (N×R) array of the polar-coordinate image data blocks, the (N×R) array including R adjacent polar-coordinate image data blocks for each of the N possible angular range values, transferred from the first external memory; and
a controller configured to perform a data conversion operation on the (N×R) array of the polar-coordinate image data blocks to generate x-y coordinate image data, and to store the x-y coordinate image data to the second external memory element,
wherein N, M, and R are all integers greater than 1,
wherein R is less than M, and
wherein an internal access time or latency for the internal memory element is shorter than an external access time or latency for the first external memory element.

2. The ultrasound system of claim 1, further comprising video processing front end circuitry connected between the ultrasound emitter and detector element and the controller, the video processing front end circuitry configured to perform front end signal processing on the polar-coordinate image data before the polar-coordinate image data is stored in the external memory.

3. The ultrasound system of claim 1, further comprising a display element for generating an ultrasound image based on the x-y coordinate image data stored in the external memory.

4. The ultrasound system of claim 3, further comprising video processing back end circuitry connected between the external memory element and the display element the video processing back end circuitry configured to perform back end signal processing on the x-y coordinate image data before the x-y coordinate image data is provided to the display element.

5. The ultrasound system of claim 1, wherein each of the polar-coordinate image data blocks includes a plurality of polar-coordinate image data elements, each of the polar-coordinate image data elements being identified by an associated radius value, an associated angular value, and multiple-bit pixel value.

6. The ultrasound system of claim 1, wherein the controller is a digital signal processor.

7. The ultrasound system of claim 1, wherein the internal access time or latency for the internal memory element is at least half of the external access time or latency for the external memory element.

8. The ultrasound system of claim 1, wherein the video chip is configured to perform a direct memory access process to perform a memory swap of one or more of the polar-coordinate image data blocks from the external memory to the internal memory.

9. The ultrasound system of claim 1, wherein the video processing chip is configured to transfer each of the polar-coordinate image data blocks in the (N×M) array from the external memory and into the internal memory only once.

10. The ultrasound system of claim 1, wherein the controller is configured to convert the sub-group of the polar-coordinate image data into a sub-group of x-y coordinate image data using an interpolation process.

11. The ultrasound system of claim 10, wherein the interpolation process is one of: bilinear interpolation, bi-cubic interpolation, and spline interpolation.

12. A method of scan-converting a set of polar-coordinate image data to a set of x-y coordinate image data, comprising:
scanning an object with an ultrasound emitter and detector element to generate polar-coordinate image data associated with the object, the polar-coordinate image data including an (N×M) array of polar-coordinate image data blocks, each of the polar-coordinate image data blocks being defined by a block angular range selected from N possible angular ranges, and a block radius range selected from M possible radius ranges;
storing the (N×M) array of the polar-coordinate image data blocks into an external memory element;
transferring an (N×R) array of the polar-coordinate image data blocks selected from the (N×M) array of the polar-coordinate image data blocks from the external memory element into an internal memory element, the (N×R) array including R adjacent polar-coordinate image data blocks for each of the N possible angular range values;
generating x-y coordinate image data based on the (N×R) array of the polar-coordinate image data blocks;
storing the x-y coordinate image data to the external memory; and
transferring one or more of the polar-coordinate image data blocks from the external memory to the internal memory, such that each of the one or more transferred polar-coordinate image data blocks replaces a previous polar-coordinate image data block, each respective transferred polar-coordinate image data block and previous polar-coordinate image data block having either a same associated angular range value or a same associated radius range value, and being adjacent to a same stored polar-coordinate image data block,
wherein a first memory access time or latency for the operation of generating the x-y coordinate image data is shorter than a second memory access time or latency for the operation of storing the (N×M) array of the polar-coordinate image data blocks into the external memory element.

13. The method of scan-converting of claim 12, wherein the method repeats the operations of generating x-y coordinate image data, storing the x-y coordinate image data to the external memory, and transferring one or more of the polar-coordinate image data blocks from the external memory to the internal memory, as needed until all of the polar-coordinate image data blocks in the (N×M) array of the polar-coordinate image data blocks have been transferred into the internal memory element.

14. The method of scan-converting of claim 13, wherein the operations of generating x-y coordinate image data, storing the x-y coordinate image data to the external memory, and transferring one or more of the polar-coordinate image data blocks from the external memory to the internal memory are repeated such that each of the polar-coordinate image data blocks is transferred from the (N×M) array into the internal memory only once.

15. The method of scan-converting of claim 12, further comprising:
providing the x-y coordinate image data from the external memory to a display element; and
generating an ultrasound image on the display element based on the x-y coordinate image data.

16. The method of scan-converting of claim 12, wherein each of the polar-coordinate image data blocks includes a plurality of polar-coordinate image data elements, each of the polar-coordinate image data elements being identified by an associated radius value, an associated angular value, and multiple-bit pixel value.

17. The method of scan-converting of claim 12, wherein the first memory access time or latency is at least half of the second memory access time or latency.

18. The method of scan-converting of claim 12, wherein the operation of transferring one or more of the polar-coordinate image data blocks from the external memory to the internal memory is performed using a direct memory access process.

19. The method of scan-converting of claim 12, wherein the operation of generating x-y coordinate image data based on the (N×R) array of the polar-coordinate image data blocks is performed using an interpolation process.

20. The method of scan-converting of claim 19, wherein the interpolation process is one of: bilinear interpolation, bi-cubic interpolation, and spline interpolation.

21. An ultrasound scan-converter, comprising:

first means for storing data, having a first stored data access time;

second means for storing data, having a second stored data access time or latency shorter than the first stored data access time or latency;

third means for storing data;

means for scanning an object with an ultrasound emitter and detector element to generate polar-coordinate image data associated with the object, the polar-coordinate image data including an (N×M) array of polar-coordinate image data blocks, each of the polar-coordinate image data blocks being defined by a block angular range selected from N possible angular ranges, and a block radius range selected from M possible radius ranges;

means for storing the (N×M) array of the polar-coordinate image data blocks into the first means for storing data;

means for transferring an (N×R) array of the polar-coordinate image data blocks selected from the (N×M) array of the polar-coordinate image data blocks from the first means for storing data into the second means for storing data, the (N×R) array including R adjacent polar-coordinate image data blocks for each of the N possible angular range values;

means for generating x-y coordinate image data based on the (N×R) array of the polar-coordinate image data blocks;

means for storing the x-y coordinate image data to the third means for storing data; and means for transferring one or more of the polar-coordinate image data blocks from the first means for storing data into the second means for storing data, such that each of the one or more transferred polar-coordinate image data blocks replaces a previous polar-coordinate image data block, each respective transferred polar-coordinate image data block and previous polar-coordinate image data block having either a same associated angular range value or a same associated radius range value, and being adjacent to a same stored polar-coordinate image data block.

22. The ultrasound scan-converter of claim 21, further comprising:

means for displaying an ultrasound image on the display element based on the x-y coordinate image data; and means for providing the x-y coordinate image data from the first means for storing data to the means for displaying an ultrasound image.

23. The ultrasound scan-converter of claim 21, wherein each of the polar-coordinate image data blocks includes a plurality of polar-coordinate image data elements, each of the polar-coordinate image data elements being identified by an associated radius value, an associated angular value, and multiple-bit pixel value.

24. The ultrasound scan-converter of claim 21, wherein the means for transferring one or more of the polar-coordinate image data blocks from the first means for storing data into the second means for storing data is configured to perform a direct memory access process.

25. The ultrasound scan-converter of claim 21, wherein the means for generating x-y coordinate image data based on the (N×R) array of the polar-coordinate image data blocks is configured to generate x-y coordinate image data using an interpolation process.

* * * * *